Patented Mar. 20, 1951

2,546,121

UNITED STATES PATENT OFFICE 2,546,121

1-HYDROXY-4-(6'-BENZODIOXAN-1',3') AMINO ANTHRAQUINONE

Saul R. Buc, Easton, Pa., and Edgar E. Renfrew, Phillipsburg, N. J., assignors to General Aniline & Film Corporation, New York, N. Y., a corporation of Delaware No Drawing. Application December 10, 1949, Serial No. 132,393

2 Claims. (Cl. 260—338)

The present invention relates to a dyestuff of the anthraquinone series which is particularly resistant to gas fading when used on acetate rayon and which is capable of dyeing acetate rayon a bluish-violet shade.

U. S. Patent 2,254,230 describes the preparation of:

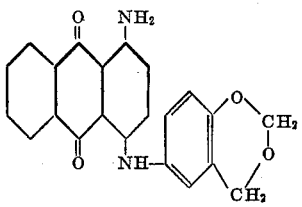

This dyestuff which yields a blue shade has the disadvantage that it is susceptible to gas fading.

It has now been discovered that an anthraquinone dye of the formula:

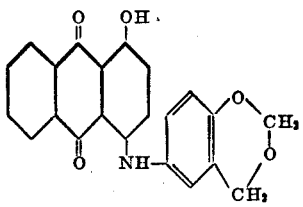

[1-hydroxy-4-(6'-benzodioxan-1',3') amino anthraquinone]

may be prepared which gives a bluish-violet shade on acetate rayon and that this dye is particularly resistant to gas fading. It is also fast to light and washing.

The following example illustrates a preferred method for preparing the dyestuff but variations and substitutions may be made within the scope of the claims.

Example

In a suitable vessel was placed 18.0 parts by weight quinizarin, 6.0 parts leucoquinizarin, 16.6 parts 6-amino-1,3-benzodioxin, 12.0 parts boric acid and 180.0 parts absolute alcohol. The mixture was stirred at the reflux temperature for sixteen hours, after which it was allowed to cool. The solid which separated was removed by filtration and washed thrice with denatured alcohol. The cake was suspended in 500 parts water and at 80° C. was added 3.5 parts sodium perborate. The mixture was stirred briefly and filtered, the cake was well washed with water. The cake was then added to a stirred solution of 500 parts water containing 25 parts sodium hydroxide solution (20% by weight). The suspension was heated for one-half hour at 80° C. and filtered. The aqueous base leach was repeated twice more and the cake from the final filtration washed alkali-free with water. The product when dried and dispersed with a suitable agent dyed cellulose acetate fibers in attractive blue-violet shades of excellent properties, especially that of fastness to acid-gas fumes such as found in combustion gases.

The fastness to gas fading was about 3 units based upon procedure described in the 1949 Technical Manual of the American Association of Textile Chemists and Colorists, pages 96 and 97. The reaction may be represented as follows:

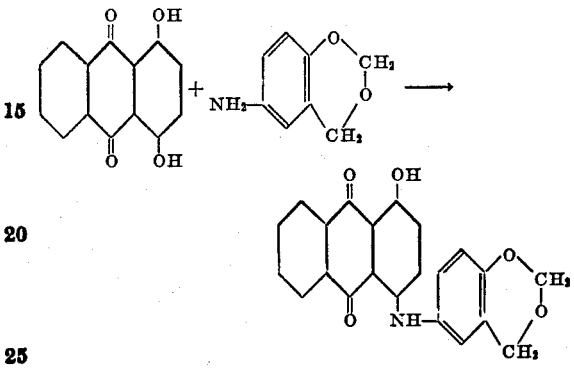

We claim:
1. A new dyestuff of the formula:

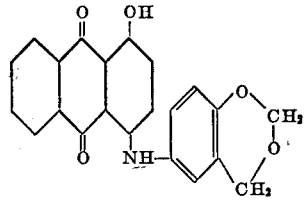

2. A process for preparing a dyestuff of the formula:

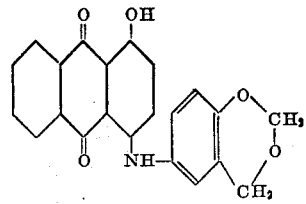

which comprises reacting quinizarin with 6-amino-1,3-benzodioxin.

SAUL R. BUC.
EDGAR E. RENFREW.

REFERENCES CITED

The following references are of record in the file of this patent:

UNITED STATES PATENTS

| Number | Name | Date |
|---|---|---|
| 2,254,230 | Lubs et al. | Sept. 2, 1941 |
| 2,391,011 | Dickey | Dec. 18, 1945 |